Dec. 6, 1960     J. ROSENKRANDS     2,963,301
SEMI-INDEPENDENT VEHICLE WHEEL SUSPENSION
Filed Sept. 29, 1958     2 Sheets-Sheet 1
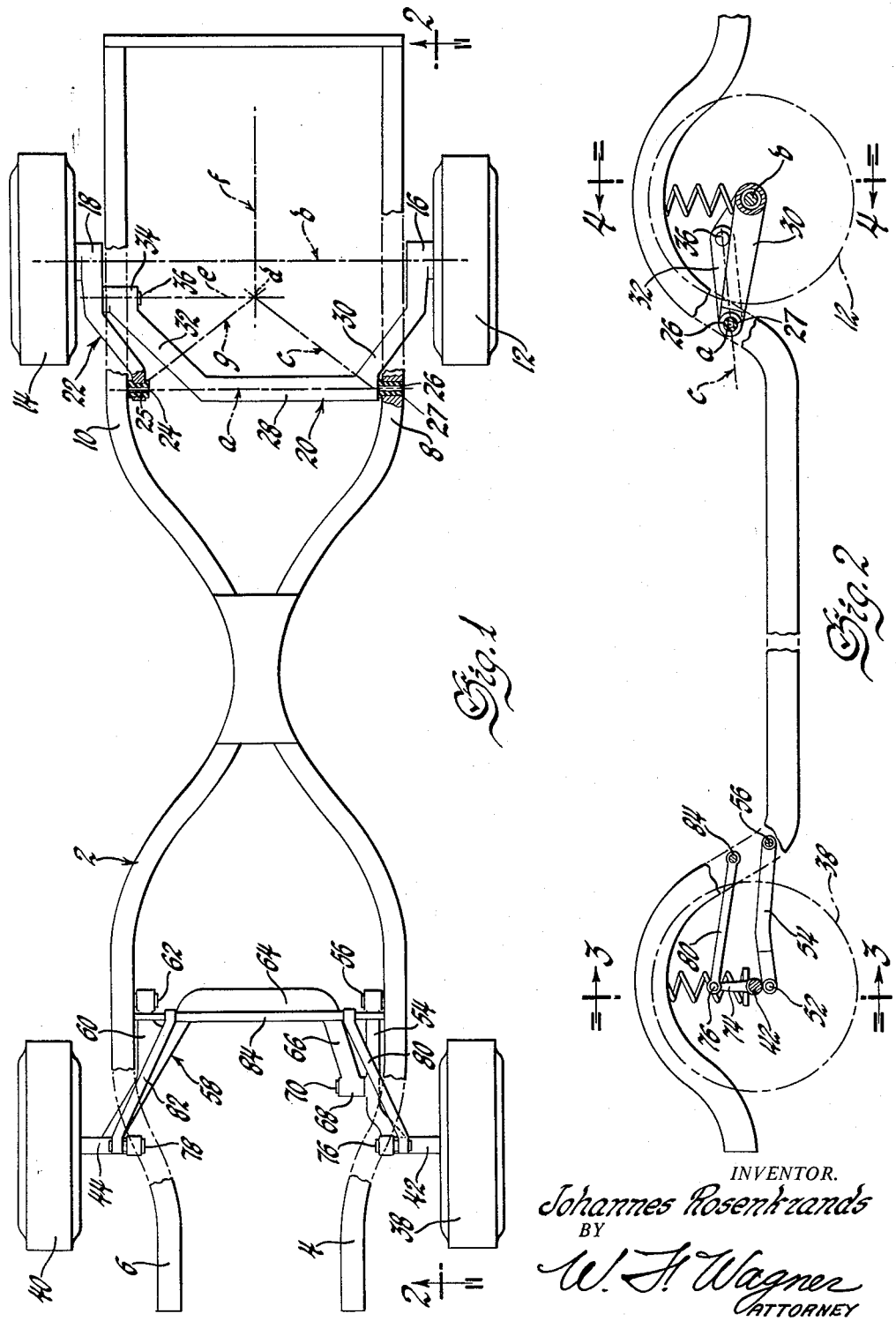
INVENTOR.
Johannes Rosenkrands
BY
W. H. Wagner
ATTORNEY Dec. 6, 1960 J. ROSENKRANDS 2,963,301
SEMI-INDEPENDENT VEHICLE WHEEL SUSPENSION
Filed Sept. 29, 1958 2 Sheets-Sheet 2

INVENTOR.
Johannes Rosenkrands
BY
W. H. Wagner
ATTORNEY

United States Patent Office 2,963,301
Patented Dec. 6, 1960

2,963,301

SEMI-INDEPENDENT VEHICLE WHEEL
SUSPENSION

Johannes Rosenkrands, Detroit, Mich., assignor to General Motors Corporation, Detroit, Mich., a corporation of Delaware Filed Sept. 29, 1958, Ser. No. 764,133

8 Claims. (Cl. 280—124)

This invention relates to vehicle suspension and particularly to linkage arrangement for connecting the sprung and unsprung mass of the vehicle.

An object of the invention is to provide an improved vehicle suspension.

Another object is to provide improved linkage for connecting the sprung and unsprung mass of a vehicle.

A further object is to provide improved linkage applicable to both dirigible wheels and driven wheels.

Still another object is to provide semi-independent wheel suspension linkage capable of maintaining the vehicle wheels in substantially parallel relation during both parallel ride deflection and roll deflection of the vehicle sprung mass.

Still a further object is to provide suspension linkage of the stated character having only two pivotal connections with the vehicle sprung mass.

A still further object is to provide semi-independent suspension for vehicle driving wheels affording geometrically induced resistance to acceleration squat and geometrically induced understeer during roll deflection.

Yet another object is to provide a semi-independent dirigible wheel suspension incorporating anti-dive geometry and including additional geometric characteristics whereby the deflection axis of each wheel is relatively low during parallel ride deflection of the sprung mass and relatively high during roll deflection of the sprung mass.

These and other objects, features and advantages of the invention will become more fully apparent as reference is had to the accompanying specification and drawings wherein:

Fig. 1 is a plan view of a vehicle chassis incorporating front and rear suspension linkage in accordance with the present invention;

Fig. 2 is a side elevational view of the structure shown in Fig. 1;

Figure 3:
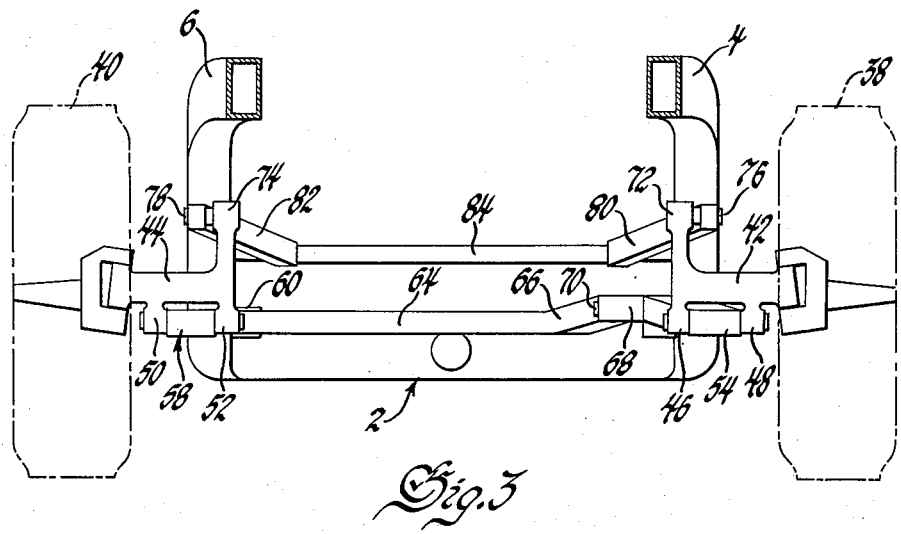
Fig. 3 is an enlarged front elevational view looking in the direction of arrows 3—3 of Fig. 2.
Figure 4:
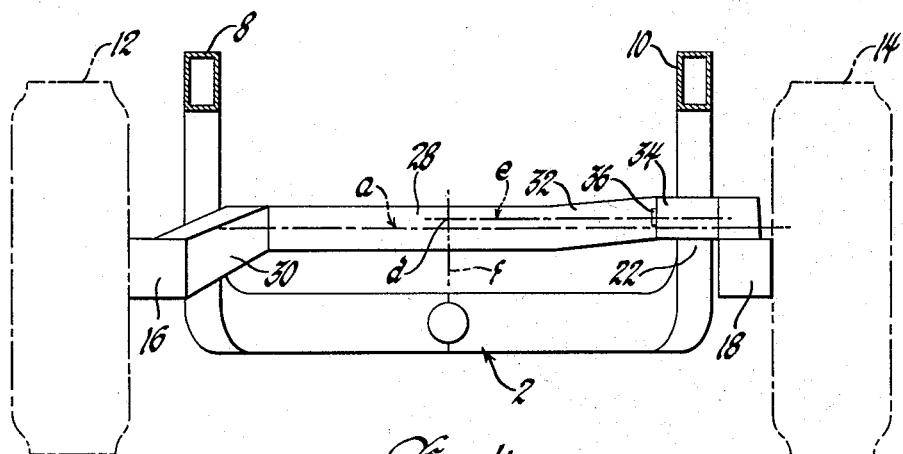
Fig. 4 is an enlarged rear elevational view looking in the direction of arrows 4—4 of Fig. 2.

Referring now to the drawings and particularly Fig. 1, there is shown a vehicle chassis including a frame designated generally by the reference numeral 2. Frame 2 includes a pair of laterally spaced forwardly extending side frame members 4 and 6 and a pair of laterally spaced rearwardly extending side frame members 8 and 10. Spaced laterally outwardly from side members 8 and 10 at the rear of the vehicle are a pair of driving wheels 12 and 14 which are rotatably supported respectively on hub portions 16 and 18 of linkage members 20 and 22, respectively. Linkage member 22 takes the form of a longitudinally extending trailing arm having its forward end pivotally connected to side member 10 by a pin joint 24 including a rubber bushing 25. Linkage member 20, in turn, is pivotally connected at its forward end to side member 8 by a pin joint 26 including a rubber bushing 27. Joint 26 is transversely aligned with joint 24. Pin joints 56, 62, 76 and 78, subsequently referred to, are also preferably of the type including a bushing of rubber or other resilient material permitting a limited degree of universal movement. As seen best in Fig. 1, member 20 includes a transverse portion 28 integral with rearwardly extending diverging arms 30 and 32. Arm 32 terminates in a hub portion 34 located laterally adjacent trailing link 22 and connected thereto intermediate its opposite ends by means of a pin joint 36. As seen best in Fig. 2, the common transverse axis $a$ defined by pin joints 24 and 26 is spaced forwardly and upwardly of the wheel axis $b$, while the axis defined by pin joint 36 is spaced forwardly from wheel axis $b$ and above the axis defined by joints 24 and 26.

Referring now to the forward end of the vehicle, the laterally spaced front wheels 38 and 40 are rotatably and dirigibly connected to a pair of normally transversely aligned laterally extending axle members 42 and 44, respectively, which are formed with integral spaced apart depending journal portions 46, 48 and 50, 52, respectively. Disposed between and pivotally connected to journal portions 46 and 48 is the forward end of a longitudinally extending link 54, the rearward end of which is pivotally secured to frame side member 4 by a pin joint 56. Disposed between and pivotally connected to portions 50 and 52 is the forward end of a second link 58 having a leg 60 extending rearwardly for connection to side rails 6 by pin joint 62. Formed integrally on leg 60 is a transverse portion 64 which includes a forwardly extending leg 66, the end of which lies laterally adjacent link 54 intermediate its forward and rearward ends. At its forward end, leg 66 is formed with a hub portion 68 which is pivotally secured to link 54 by a pin joint 70. It will now be seen that the basic linkage structure for both the front and rear wheels are essentially similar, except in the sense that the direction of the linkage is reversed with respect to the direction of movement of the vehicle. However, because of the dirigible requirements of the front wheels, additional linkage structure is incorporated at the front of the vehicle which provides for positive control of caster angle and induces the desired degree of anti-dive geometry.

As seen best in Fig. 3, axle members 42 and 44 also include integral vertically extending portions 72 and 74, respectively, the upper extremities of which are pivotally connected by pin joints 76 and 78 to rearwardly converging links 80 and 82, respectively. The rearward ends of links 80 and 82, in turn, are pivotally secured to a transversely extending shaft 84, the opposite ends of which are secured to side rail members 4 and 6 at a vertical level above and forwardly of the imaginary axis defined by pivots 56 and 62.

In order that the invention may be more fully understood, description of the essential geometric motion derived therefrom, with respect to both the front and rear suspension, follows:

By reference to the plan view of the rear suspension shown in Fig. 1, it will be evident that under conditions of parallel ride deflection or fore and aft pitching motion, both wheels 12 and 14 will deflect upwardly or downwardly an equal amount. Because of the uniform deflection of both wheels, both links 20 and 22 will travel through corresponding and vertical arcs. Therefore, all such motion will occur about the imaginary transverse axis $a$ extending between pin joints 24 and 26. Since axis $a$ is located above the wheel axis $b$, resistance to acceleration "squat" is afforded in the known manner. In this respect, the arrangement of linkage in the present invention performs identically to conventional trailing arm independent wheel suspensions of the prior art. However, in conventional trailing arm independent suspension, the relative disposition of axes $a$ and $b$ remains fixed and causes an oversteer condition owing to the fact that the outboard wheel will toe-out under compression deflection while the inboard wheel will toe-in under rebound deflection. In the present invention, when vehicle operation induces roll motion or lateral tilting of the sprung mass, the effective axis of motion for each wheel 12 and 14 departs from the imaginary axis defined by pivots 24 and 26. Assume, for example, that the vehicle is traveling in a curved path toward the right as viewed in Fig. 1. Under these circumstances, the left side of the frame will tend to descend relative to wheel 12, while the right side of the frame ascends relative to wheel 14, a condition equivalent to concurrent upward and downward deflection of wheels 12 and 14, respectively. Since wheels 12 and 14 do not follow corresponding vertical paths, wheel 12 is constrained to move upwardly with respect to the vehicle frame about the imaginary axis $c$ extending between pin joint 26 and the point $d$ at the intersection of the extended axis $e$ of pin joint 36 with the vehicle longitudinal central plane $f$. Similarly, wheel 14 moves downwardly about the imaginary axis $g$ extending between pin joint 24 and point $d$. Since the point $d$ is above pin joints 24 and 26, both imaginary axes $c$ and $g$ tilt upwardly and inwardly. Because of this inclined axis of motion, wheel 12 is caused to toe in as it moves toward the bump or compression position, while wheel 14 is caused to toe out as it moves toward the rebound position thereby producing a rear wheel steer angle tending to steer the vehicle out of the turn in which it is engaged. In addition to providing the requisite understeer during roll, suspension according to the present invention has the additional advantage of causing the rear wheels to remain substantially perpendicular to the road surface during roll and thus virtually eliminates change in track width which ordinarily occurs in conventional trailing arm suspension and which accounts for excessive tire wear. In practice, the degree of understeer provided by the subject suspension may be varied as desired by proper location of the pin joint 36, increase in understeer being obtained by raising the height of the axis defined thereby. The roll center height may be similarly adjusted by varying the longitudinal distance between the axis of joint 36 and the imaginary axis defined by joints 24 and 26.

Referring now to the front suspension, it will be evident that the geometric action of links 54 and 58 during parallel ride deflection will correspond to that described in connection with the rear wheels and, therefore, result in maintaining the wheels 38 and 40 in exact parallelism during vertical deflection thereof. It will also be evident that links 80 and 82 owing to their symmetrical arrangement do not interfere with the motion described, but only act to control the wheel caster angle and to absorb brake torque. It will also be evident that, owing to the structural and geometric similarity between the rear suspension and the lower linkage of the front suspension, roll motion of the sprung mass will tend to induce toe out of front wheel 38 and toe in of front wheel 40. However, since the actual steering angle of wheels 38 and 40 is manually controlled in the usual manner by suitable steering linkage, not shown, steering induced by roll geometry will be automatically cancelled by normal operation of the steering mechanism. Therefore, although during roll motion each front wheel is caused to deflect about an oblique axis in the same manner described with respect to the rear wheels, the influence of such axis of motion is limited to the benefits derived from maintaining the front wheels in substantial parallelism and perpendicular to the road surface, i.e., negligible change in track width and attendant freedom from tire wear induced by lateral scrubbing.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. In a vehicle suspension, asymmetric linkage disposed between the sprung and unsprung mass of the vehicle, said linkage comprising a pair of transversely spaced trailing links hinged on said sprung mass on a common axis transverse of the vehicle, a transversely extending member integral with one of said links, and means pivotally connecting said member with the other link intermediate its length.

2. In a vehicle suspension, asymmetric linkage disposed between the sprung and unsprung mass of the vehicle, said linkage comprising a pair of transversely spaced trailing links hinged on said sprung mass on a common axis transverse of the vehicle, a transversely extending member integral with one of said links, and means pivotally connecting said member with the other link in longitudinally spaced relation from said common transverse axis.

3. In a vehicle suspension, asymmetric linkage disposed between the sprung and unsprung mass of the vehicle, said linkage comprising a pair of transversely spaced trailing links hinged on said sprung mass on a common axis transverse of the vehicle, a transversely extending member integral with one of said links, and means pivotally connecting said member with the other link intermediate its length, said last mentioned means being spaced vertically from said common axis.

4. In a vehicle having driving wheels, asymmetric linkage disposed between the sprung mass and the wheels, said linkage comprising a pair of transversely spaced trailing links hinged at their forward ends to said sprung mass on a common axis transverse of the vehicle and vertically upward relative to the axis of rotation of said wheels, a transversely extending member integral with one of said links, and means pivotally connecting said member with the other link intermediate its length and vertically upwardly relative to said common axis whereby to induce geometric understeer responsive to roll motion of the sprung mass and squat resistance responsive to vehicle acceleration.

5. The structure set forth in claim 4 wherein said hinged connections permit limited universal motion.

6. The structure set forth in claim 4 wherein said hinged connections include elastomeric bushings.

7. In a motor vehicle having a sprung mass and an unsprung mass including dirigible wheels, asymmetric suspension linkage between the sprung and unsprung mass comprising, wheel supporting axles, a pair of transversely spaced forwardly extending links pivoted to said axles and hinged on said sprung mass on a common axis transverse of the vehicle, a transversely extending member integral with one of said links and pivotally connected with the other link intermediate its length, and a second pair of forwardly extending links pivotally connecting said axles to said sprung mass, said second pair being spaced above said first pair.

8. In a motor vehicle having a sprung mass and an unsprung mass including dirigible wheels, asymmetric suspension linkage between the sprung and unsprung mass comprising, wheel supporting axles, a pair of tranversely spaced forwardly extending links pivoted to said axles and hinged on said sprung mass on a common axis tranverse of the vehicle, a tranversely extending member integral with one of said links and pivotally connected with the other link intermediate its length and above said common axis, and a second pair of forwardly extending links pivotally connecting said axles to said sprung mass, said second pair being spaced above said first pair.

References Cited in the file of this patent
UNITED STATES PATENTS

| | | |
|---|---|---|
| 2,347,948 | Hassett | May 2, 1944 |
| 2,705,152 | Walter | Mar. 29, 1955 |
| 2,739,658 | Kolbe | Mar. 27, 1956 |
| 2,768,002 | Rabe | Oct. 23, 1956 |